UNITED STATES PATENT OFFICE.

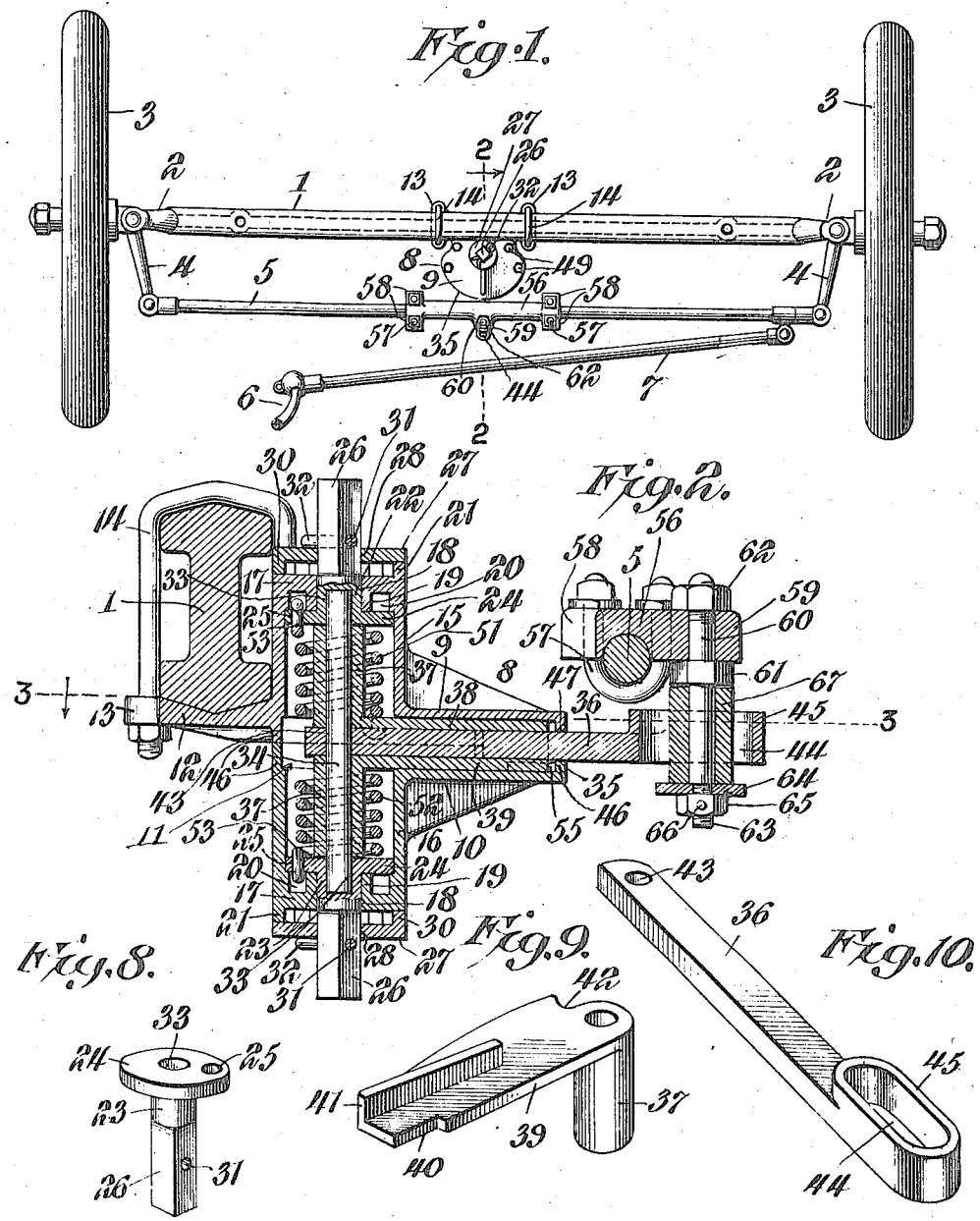

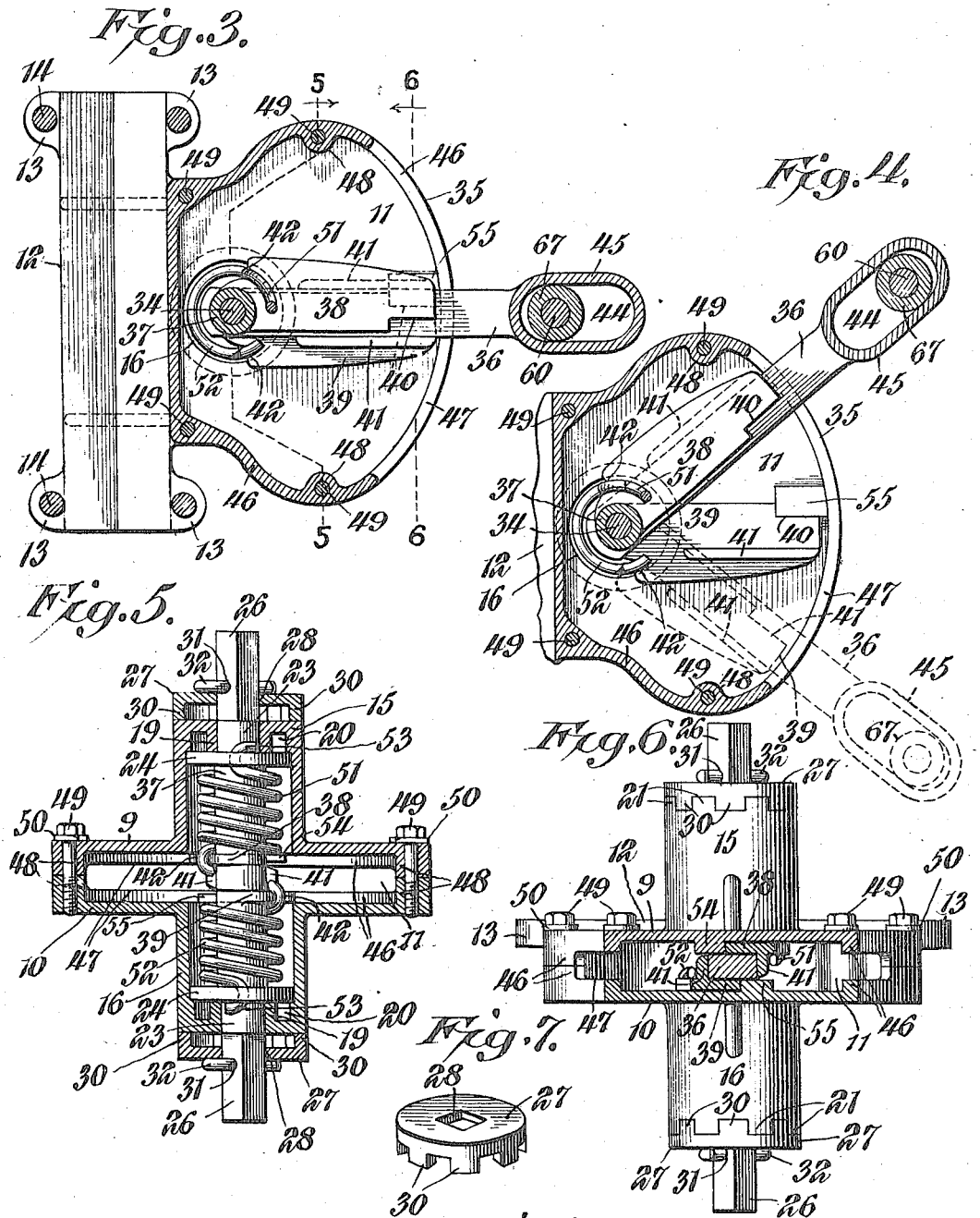

WILLIS J. CORKRAN, OF TOWSON, MARYLAND.

STEERING ATTACHMENT FOR AUTOMOBILES.

1,233,987. Specification of Letters Patent. Patented July 17, 1917.

Application filed January 15, 1914. Serial No. 812,283.

*To all whom it may concern:*

Be it known that I, WILLIS J. CORKRAN, a citizen of the United States, residing at Towson, in the county of Baltimore and State of Maryland, have invented a new and useful Steering Attachment for Automobiles, of which the following is a specification.

This invention has reference to steering attachments for automobiles, and is designed especially for the automatic control of the steering wheels of the automobile to maintain them centralized independently of the operator, and this despite deflections of the steering wheels due to the engagement of one or the other or both of the wheels with obstructions.

In accordance with the present invention the steering wheels are under the control of oppositely acting centralizing springs tending to maintain the wheels central or straight ahead, and these springs are restricted in their normal tendency, so that each tends to bring the wheels to the centralized position, and there hold them positively by a stop arrangement preventing the springs in their centralizing action from causing the wheels to override the centralized position. By the arrangement of the present invention it is not necessary that the normal tendencies of the oppositely-acting springs be equal, for neither spring can act to move the steering wheels beyond the determined central position. However, the structure of the present invention is such that should either or both steering wheels meet an obstruction tending to deflect the wheel or wheels, such deflection is resisted by the normal force of the spring affected, and the wheels are not deflected so long as the deflecting action is less than the resistance of the affected spring thereto, and under normal conditions of travel the steering wheels are not noticeably deflected, and an obstruction is easily overridden, even though the operator is not at the time in control of the steering head. If the obstruction be of a character to present a greater force to deflect the steering wheel or wheels than the resistance of the spring affected, then said spring would yield, but as soon as the obstruction is passed the steering wheels are immediately returned to their normal centralized position, and the vehicle proceeds as before with but a momentary divergence from the course of travel.

Practice has demonstrated that the centralizing device of the present invention does not interfere to any material extent with the normal steering of the vehicle, and in fact the steering qualities of the vehicle are noticeably improved, since sudden divergences caused by obstructions only momentarily affect the course of the vehicle irrespective of the control of the vehicle by the operator and the strain upon the operator in attempting to guard against such sudden divergences is relieved.

The invention will be best understood from a consideration of the following detailed description, taken in connection with the accompanying drawings, forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—

Figure 1 is a plan view of the steering wheels of an automobile, together with the axle and sufficient of the steering mechanism for an understanding of the present invention, with the improved attachment applied.

Fig. 2 is a section on the line 2—2 of Fig. 1, but drawn on a larger scale and omitting distant parts.

Fig. 3 is a section on the line 3—3 of Fig. 2.

Fig. 4 is a view similar to Fig. 3 but showing a different operative position of the parts.

Fig. 5 is a section on the line 5—5 of Fig. 3.

Fig. 6 is a section on the line 6—6 of Fig. 3.

Fig. 7 is a perspective view of a locking cap or ring.

Fig. 8 is a perspective view of one of the tightening members for one of the springs.

Fig. 9 is a perspective view of one of the movable stop members.

Fig. 10 is a perspective view of the arm or lever for joining the structure to the connecting link or rod extending between the knuckle arms of the steering wheels.

The present invention is particularly adaptable to the type of automobile known as the Ford, but it is also useful in connection with other types of automobiles. In Fig. 1 there is shown an axle 1 carrying knuckles 2 at the ends, and these knuckles in turn carry the hubs of wheels 3 constituting the steering wheels of the vehicle. The knuckles, as is usual, have arms 4 connected together by a rod 5, so that the wheels may be moved simultaneously by steering mechanism simply indicatively represented at 6, joined to the steering wheel connections by a rod 7. The particular showing of Fig. 1 with respect to the devices named is that of the structures employed upon the Ford automobile, but may be considered as indicative of any automobile to which the present invention is adaptable.

The structure of the present invention includes a casing 8 made up of two plates 9, 10, which may be in most respects identical, the casing inclosing a chamber 11 which in the particular construction shown is quite broad and of relatively little depth or thickness. The plate 9 differs from the plate 10 in being provided with a flange 12 shown as of greater width than the casing and shaped on one face to engage against the axle 1, and since in the Ford automobile the axle is usually of I cross section, the flange 12 is shaped to fit the axle and is provided with perforated ears 13 for the reception of U bolts 14 so arranged as to embrace the axle and bind the flange 12 thereto with the casing 8 presented edgewise toward the connecting rod 5 but at a lower level. That edge of the casing presented toward the rod 5 is preferably rounded upon an axis adjacent to the flange 12 and midway of the width of the casing, and the plates 9 and 10 of the casing are provided, in alinement with the axis of curvature of the rear edge of the casing, considering the latter as installed on an automobile, with casing extensions or housings 15, 16, respectively, each preferably of cylindrical form and closed in at the end remote from the respective plate by a head 17 provided with a central passage 18 surrounded by an axially extended annular flange 19 directed toward the respective plate 9 or 10, as the case may be, this flange 19 defining an annular groove 20 between the flange and the inner wall of the housing 15 or 16. The outer end of each housing 15 and 16 is provided with axially extended studs or teeth 21 in spaced relation one to the other to form a circular row thereof.

Adapted to the central passages 18 of the housings 15 and 16 are respective winding spindles 22, 23, each terminating at one end in a laterally expanded disk-like head 24 through which there is an eccentrically placed passage 25 for a purpose which will presently appear. The outer end of each spindle 22, 23 is squared, as indicated at 26, and the squared portion of each spindle which when in position in the respective housing projects outwardly beyond the head 17, is adapted to receive a lock disk 27, one of which is shown separately in Fig. 7. This disk has a squared central axial passage 28, and on one face a circular series of axially extended studs or teeth 30 matching in spacing and other particulars the circular series of studs or teeth 21 on the outer ends of the respective housings 15 and 16. The axial length of the squared portions 26 of the winding spindles is such that when in place in the housings they not only project through the heads 17 but through the locking disks 27 and beyond the same a sufficient distance for the application of a winding tool such as a wrench, and each squared portion is traversed by a passage or perforation 31 so positioned as to be outside of the disk 27 when in place on the winding spindle, and the perforation 31 is provided for the reception of a pin 32 preferably, though not necessarily, in the form of a cotter pin.

Each winding spindle is formed with an axial socket 33 entering the spindle through that face of the head 24 remote from the spindle and extending between the two spindles and entering the sockets 33 is a rod 34 in the axis of rotation of the spindles and also in the axis or center line of the housings 15 and 16, and in the axis of generation of the curved edge of the casing 8, which curved edge is indicated by the reference numeral 35.

The rod 34 carries at a point about midway of its length an arm 36 and between this arm and the heads 24 the rod 34 is surrounded by elongated hubs 37 each extending from one face of one end of a respective plate or arm 38, 39, the combined thickness of the plate-like arms 38 and 39 and the arm 36 being approximately that of the depth of the chamber 11, so that the arm 36 is centralized in the chamber 11 between the two plates 9 and 10. Each arm 39 is formed at the end remote from the hub 36 with a notch or recess 40 formed in one long edge of the plate, while adjacent to the other long edge of the plate is a rib 41 substantially perpendicular to that face of the plate remote from the hub 36 and in substantially parallel relation to the edge in which the recess 40 is formed. Adjacent to the hub 36 the plate 38 or 39, as the case may be, is widened and there provided with a notch or recess 42.

The arm 36 at the end mounted on the rod 34 is provided with a suitable passage 43 for said rod 34, while the other end of the arm 36 is provided with an elongated slot 44 surrounded by a flange 45 outstanding from one face of the arm 36, this being usually the upper face in the installed device.

Each plate 9 and 10 is formed on the face toward the other plate with a marginal flange 46 defining the chamber 11, and about the curved edge 35 the flange 46 is cut away for a portion of its depth as indicated at 47, to form an elongated passageway for the arm 36 to swing about the axis of the rod 34. At appropriate points the plates 9 and 10 are formed with bosses 48 traversed by screws 49 threaded into the bosses of one of the plates, say, the plate 10, and these screws may be held against accidental loosening by locking washers 50.

The hubs 36 of the respective arms 38 and 39 are surrounded by respective coiled springs 51 and 52 each having one end 53 passed through the eccentric perforation 25 in the head 24 of the respective winding arbor, and the other end engaged in the notch 42 of the respective plate 38 or 39 as the case may be.

The tendency of the springs 51 and 52 is to move the respective arms 38 and 39 toward each other with the flanges or webs 41 in engagement with the respective opposite sides of the arm 36 in their path and in the path of each arm 38 and 39 so as to enter the recess 40 therein is a respective lug 54, 55, as the case may be, formed on the inner face of the respective plate 9 or 10 adjacent to the opening along the edge 35 for the arm 36.

Adapted to the rod 5 is a clip plate 56 which may be of such length as to bring no material strain upon the rod, and this plate is held to the rod by U bolts 57 extending through ears 58 on the plate. At about midway of the plate there is formed a lateral ear 59 through which is passed a pin 60 having a flange 61 thereon to engage one face of the ear 59, while on the other side of the ear a nut 62 is applied to the pin 60, the latter being threaded for the purpose. On the other side of the flange 61 from the ear 59 the pin 60 is of a length to extend through the slot 54 of the arm 36 and terminates in a threaded prolongation 63 of smaller diameter than the main body of the pin to form a shoulder for a washer 64 and to receive a nut 65 holding the washer in place, which nut may be locked in position by a small pin 66 traversing it and the extension 63. Applied to the pin 60 about that portion extending through the slot 44 is a roller 67 held to the pin between the flange 61 and washer 64, the roller serving to reduce friction on engagement with the walls of the slot 44.

When the automobile is equipped with the device of the present invention the clip plate 56 is so placed upon the rod 5 that with the arm 36 in the central position determined by the engagement of the arms 39 with said arm 36 and with the lugs 54 and 55 and the springs 51 and 52 wound to the desired tension, the wheels 3 of the vehicle are lined for straight-ahead travel. The springs 51 and 52 are put under tension by the application of a suitable tool to the squared end 26 of the winding arbor 22 or 23, as the case may be, the cotter pins 32 having been first withdrawn if already applied, and the locking disks 27 being out of engagement with the teeth or lugs 21 at the ends of the respective housings 15 and 16. When the desired tension of the springs has been attained the locking disks 27 are moved along the winding arbors until their teeth 30 enter between the teeth 21, thus preventing return motion of the winding arbors and the unwinding of the springs. The locking disks 27 are thereupon locked in place by the cotter pins 32. The tendency of each spring 51 and 52, as the case may be, is to move the respective arm 38 or 39 toward its lug 54 or 55, and such lug holding the arm 38 or 39 against further movement serves as a stop for the arm, so that the action of the spring cannot extend any farther in the unwinding direction than is permitted by the movement of the arm 38 or 39 into engagement with its stop lug 54 or 55, as the case may be. The arm 38 or 39 may, however, move in the opposite direction, but this movement is opposed by the resistance of the spring 51 or 52, so that the arm can only be moved in such direction by the exertion of a sufficient force to overcome the resistance of the spring. The arm 36 is lodged between the flanges or ribs 41 of the two arms 38 and 39, one of which is in the path of the arm when moved in one direction about its axis of movement and the other in the path of the arm when the latter is moved in the opposite direction, wherefore movement of the arm 36 in either direction is opposed by the tension of one of the two springs 51 and 52 and the arm 36 can be moved in either direction only by the exertion of a force sufficient to overcome either one or the other of the two springs. The arm 36 controls the steering wheels so that the latter are held to their straight-ahead course by the force exerted by the springs 51 and 52.

Suppose, now, that one or the other of the steering wheels meets an obstruction. If this is not a large obstruction then the wheel will ride over it without bringing the returning function of the centralizing device of the present invention into play, for if this force is less than the resistance of the springs, then the wheels are not moved to one side or the other of their course, but are able to overcome the obstruction without deflection, and so ride over it. Again, let it be assumed that the obstruction is sufficient to overcome one or the other of the springs, then the wheels will turn on their knuckle supports in one direction or the other, and through the connecting pin 60 the arm 36 is swung in a corresponding direction engaging the corresponding arm 39 by the flange or rib 41, thus turning the arm on its axis of movement and putting the respective spring 51 or 52 under greater stress than before. As soon as the obstruction has been passed the reaction of the operated spring at once returns the deflected arm 38 or 39 toward the central position where its further movement is arrested by the engagement with the lug 54 or 55, as the case may be, so that the steering wheels are brought back quickly to their straight-ahead position and the vehicle continues on its course as though the obstruction had not been met.

It is not necessary that the normal tension of the springs should be very great and at no time need it be so great as to interfere materially with the operation of the ordinary steering of the vehicle by the usual hand wheel or steering head, so that the presence of the centralizing device upon the vehicle is not noticeably evident in the operation of the vehicle.

Experience has proven that the springs 51 and 52 need not be under like tension, for their tension may vary to a considerable extent without interference with the centralizing action of the device, this being due to the positive stop preventing any overrunning of the action of the springs beyond the centralizing or straight ahead position of the steering wheels. This has been found very essential and permits the use of coiled springs individual to the respective direction of deflection of the wheels, so that in the event of a deflection of the steering wheels but one of the springs is active at a time, and this spring is not affected in any way by the other spring, but the two springs simply tend to hold the wheel controlling arm in the centralized position by oppositely acting forces which may represent the full effect of the respective spring without a weakening effect from the other. Neither spring has any effect in its normal action upon the steering wheels beyond the centralizing position to which it normally tends to move the wheels, the action of the spring being as great as desired up to the centralizing position, and then immediately drops to zero as regards further movement in the same direction, and the controlling arm 36 is wholly free from the effect of one of the springs and only subject to the effect of the other spring when it is moved in either direction from the centralized position.

What is claimed is:—

1. In a steering attachment for automobiles, a pivoted arm constructed for connection to a movable part of the steering mechanism, other spring-controlled pivoted arms movable in opposite directions into opposing engagement with the first-named arm, and a support for the arms constructed for fixed attachment to a relatively fixed portion of the vehicle and provided with stop means for limiting the movement of the second-named arms under the action of the spring means controlling them, all the arms being mounted on a common axis.

2. In a steering attachment for automobiles, a pivoted arm constructed for connection to a movable part of the steering mechanism, other pivoted arms movable in opposite directions into opposing engagement with the first-named arm, axially located springs each connected to and controlling a respective one of the second-named pivoted arms, and a support for the arms constructed for fixed attachment to a relatively fixed portion of the vehicle and provided with stop means for limiting the movement of the second-named arms under the action of the springs controlling them, all the arms being mounted on a common axis, and each of the second-named arms having means individual thereto and to the controlling springs thereof for pretensioning the latter separately.

3. A steering attachment for automobiles comprising a casing inclosing a chamber and including alined housings, said casing having means for its attachment to the front axle of an automobile, an arm pivoted at one end in the casing in the common axis of the alined housings and at the other end projecting beyond the casing and there formed for attachment to a movable part of the steering mechanism of the automobile, other arms pivoted in the casing in the longitudinal axis of the housings and provided with engaging means for the first-named arm on opposite sides thereof, and springs mounted in the housings of the casing and acting respectively in opposite directions upon the second-named pivoted arms to centralize the first-named arm, the second-named arms and the casing having co-acting stop portions for limiting the movement of the second named arms under the normal action of the springs to the centralized position.

4. A steering attachment for automobiles comprising a casing inclosing a chamber and including alined housings, said casing having means for its attachment to the front axle of an automobile, an arm pivoted at one end in the casing in the common axis of the alined housings and at the other end projecting beyond the casing and there formed for attachment to a movable part of the steering mechanism of the automobile, other arms pivoted in the casing in the longitudinal axis of the housings and provided with engaging means for the first-named arm on opposite sides thereof, and springs mounted in the housings of the casing and acting respectively in opposite directions upon the second named pivoted arms to centralize the first-named arm, the second-named arms and the casing having coacting stop portions for limiting the movement of the second-named arms under the normal action of the springs to the centralized position, each spring being provided with a winding member individual thereto for placing the spring under initial torsional stress.

5. A steering attachment for automobiles, comprising a support constructed for attachment to the front axle of an automobile a pivotal member in the support, an arm mounted on the pivotal member to turn about the longitudinal axis thereof and constructed for connection with a movable part of the steering mechanism, other arms mounted on the pivotal member for movement about the longitudinal axis thereof and each provided with an engaging member for the first-named arm, the engaging members of the second-named arms being arranged to engage the first-named arm on respectively opposite sides thereof, coiled springs individual to the second-named arms and in surrounding relation to the pivotal support and each at one end connected to a respective one of the second-named arms, and winding means individual to the respective springs and mounted to turn in the pivotal axis of the arms, the support being provided with stop means for limiting the movements of the second-named arms under the action of the springs.

6. A steering attachment for automobiles, comprising a casing having means for its attachment to the axle of an automobile, said casing inclosing a chamber and provided with alined housings leading from said chamber and also at a point distant from the housings having an opening elongated in a plane substantially perpendicular to the common longitudinal axis of the housings, a pivot rod lodged in the longitudinal axis of the housings, winding arbors receiving the ends of the pivot rod and mounted in the longitudinal axis of the housings at the ends of the latter remote from the chamber and having portions accessible at the exterior of the chamber, locking members for the winding arbors, an arm mounted at one end on the pivoted rod and extending to and beyond the open side of the chamber and outside of the latter shaped for attachment to a movable part of the steering mechanism of the automobile, other arms with elongated hubs mounted on the pivot rod on opposite sides of the first-named arm with the hubs extending into the housings toward the winding arbors, and coiled springs individual to the second-named arms and each surrounding a respective hub with one end connected to the respective arm and the other to a respective one of the winding arbors.

7. A steering attachment for automobiles, comprising a casing having means for its attachment to the axle of an automobile, said casing inclosing a chamber and provided with alined housings leading from said chamber and also at a point distant from the housings having an opening elongated in a plane substantially perpendicular to the common longitudinal axis of the housings, a pivot rod lodged in the longitudinal axis of the housings, winding arbors receiving the ends of the pivot rod and mounted in the longitudinal axis of the housings at the ends of the latter remote from the chamber and having portions accessible at the exterior of the chamber, locking members for the winding arbors, an arm mounted at one end of the pivot rod and extending to and beyond the open side of the chamber and outside of the latter shaped for attachment to a movable part of the steering mechanism of the automobile, other arms with elongated hubs mounted on the pivot rod on opposite sides of the first-named arm with the hubs extending into the housings toward the winding arbors, and coiled springs individual to the second-named arms and each surrounding a respective hub with one end connected to the respective arm and the other to a respective one of the winding arbors, the casing including stop members for the second-named arms for engagement by them when the first-named arm is in a central position and said second-named arms being each provided with a member for engaging the respective side of the first-named arm.

8. A steering attachment for automobiles comprising a casing having means for its attachment to the axle of an automobile, said casing inclosing a chamber and provided with alined housings leading from said chamber and also at a point distant from the housings having an opening elongated in a plane substantially perpendicular to the common longitudinal axis of the housings, a pivot rod lodged in the longitudinal axis of the housings, winding arbors receiving the ends of the pivot rod and mounted in the longitudinal axis of the housings at the ends of the latter remote from the chamber and having portions accessible at the exterior of the chamber, locking members for the winding arbors, an arm mounted at one end on the pivot rod and extending to and beyond the open side of the chamber and outside of the latter shaped for attachment to a movable part of the steering mechanism of the automobile, other arms with elongated hubs mounted on the pivot rod on opposite sides of the first-named arm with the hubs extending into the housings toward the winding arbors, and coiled springs individual to the second-named arms and each surrounding a respective hub with one end connected to the respective arm and the other to a respective one of the winding arbors, the casing including stop members for the second-named arms for engagement by them when the first-named arm is in a central position and said second-named arms being each provided with a member for engaging the respective side of the first-named arm, and the attachment including a clamp member adapted to be secured to the connecting rod for the steering knuckles of the automobile and provided with a pin for engaging the first-named arm, said arm having an elongated slot for the passage of the pin.

In testimony that I claim the foregoing as my own, I have hereto affixed my signature in the presence of two witnesses.

WILLIS J. CORKRAN.

Witnesses:
JOHN H. SIGGERS,
DAVID R. WAGNER.

Copies of this patent may be obtained for five cents each, by addressing the "Commissioner of Patents, Washington, D. C."